United States Patent [19]

Tewari et al.

[11] Patent Number: 4,610,863

[45] Date of Patent: Sep. 9, 1986

[54] PROCESS FOR FORMING TRANSPARENT AEROGEL INSULATING ARRAYS

[75] Inventors: Param H. Tewari, Milpitas; Arlon J. Hunt, Oakland, both of Calif.

[73] Assignee: The United States of America as represented by the United States Department of Energy, Washington, D.C.

[21] Appl. No.: 772,528

[22] Filed: Sep. 4, 1985

[51] Int. Cl.$^4$ .............................................. C01B 33/12
[52] U.S. Cl. .................................. 423/338; 423/336; 502/10
[58] Field of Search .................... 502/10; 423/336, 338

[56] References Cited

U.S. PATENT DOCUMENTS

| | | | |
|---|---|---|---|
| 2,631,966 | 3/1953 | Francis | 208/328 |
| 2,927,083 | 3/1960 | Nickerson | 423/338 |
| 3,652,215 | 3/1972 | Aboutboul et al. | 423/338 |
| 3,672,833 | 6/1972 | Teichner et al. | 423/338 |
| 3,977,993 | 8/1976 | Lynch | 423/338 |
| 4,402,927 | 9/1983 | von Dardel et al. | 423/338 |
| 4,432,956 | 2/1984 | Zarzycki | 423/338 |

OTHER PUBLICATIONS

"Advances in Transparent Insulating Aerogels for Windows", Hunt et al., presented at the Passive and Hybrid Solar Energy Update Meeting 9/5/84.
"Structure and Chemistry of Sol-Gel Derived Transparent Silica Aerogel", Tewari et al., Feb. 1985.
"Ambient Temperature Supercritical Drying of Transparent Silica Aerogels, Tewari et al., 2/21/85.

Primary Examiner—John Doll
Assistant Examiner—Lori S. Freeman
Attorney, Agent, or Firm—L. E. Carnahan; Roger S. Gaither; Judson R. Hightower

[57] ABSTRACT

An improved supercritical drying process for forming transparent silica aerogel arrays is described. The process is of the type utilizing the steps of hydrolyzing and condensing aloxides to form alcogels. A subsequent step removes the alcohol to form aerogels. The improvement includes the additional step, after alcogels are formed, of substituting a solvent, such as $CO_2$, for the alcohol in the alcogels, the solvent having a critical temperature less than the critical temperature of the alcohol. The resulting gels are dried at a supercritical temperature for the selected solvent, such as $CO_2$, to thereby provide a transparent aerogel array within a substantially reduced (days-to-hours) time period. The supercritical drying occurs at about 40° C. instead of at about 270° C. The improved process provides increased yields of large scale, structurally sound arrays. The transparent aerogel array, formed in sheets or slabs, as made in accordance with the improved process, can replace the air gap within a double glazed window, for example, to provide a substantial reduction in heat transfer. The thus formed transparent aerogel arrays may also be utilized, for example, in windows of refrigerators and ovens, or in the walls and doors thereof or as the active material in detectors for analyzing high energy elementry particles or cosmic rays.

18 Claims, 4 Drawing Figures

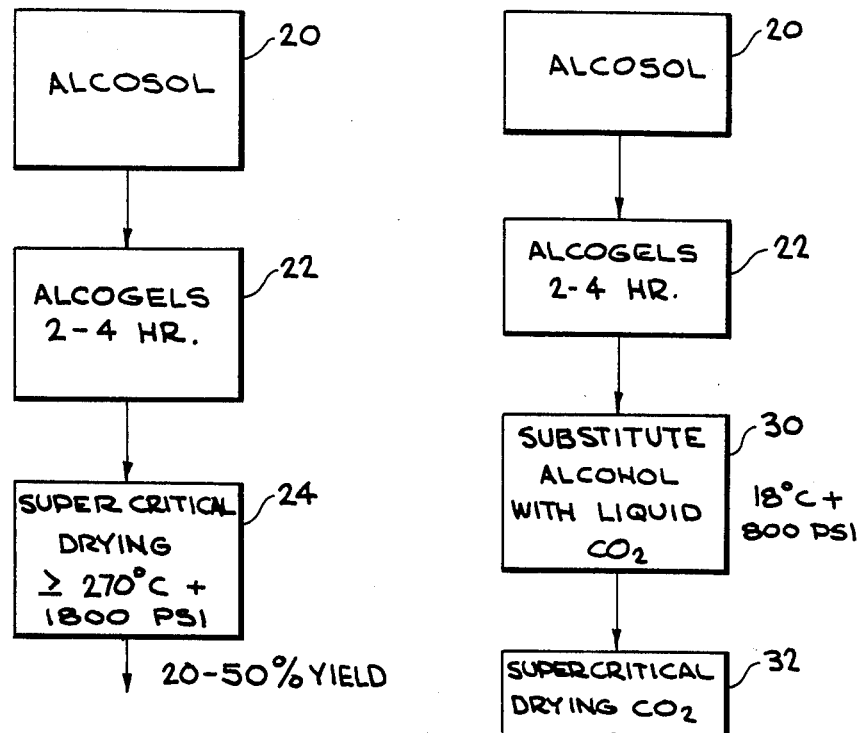
FIG. 1
(PRIOR ART)
FIG. 3
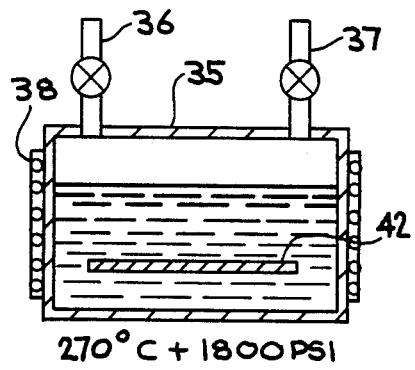
FIG. 2
(PRIOR ART)
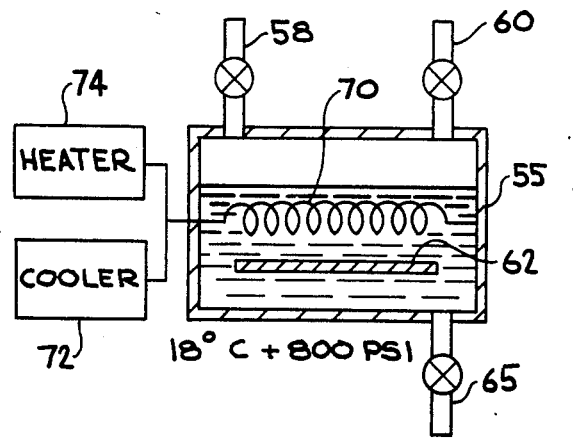
FIG. 4

PROCESS FOR FORMING TRANSPARENT AEROGEL INSULATING ARRAYS

BACKGROUND OF THE INVENTION

The invention described herein arose in the course of, or under, Contract No. DE-AC03-76SF00098 between the United States Department of Energy and the University of California.

This invention relates to transparent silica aerogels, particularly to a process for fabricating such aerogels, and more particularly to an improved supercritical drying process carried out in the aerogel fabricating process.

Windows play an important role in the energy utilization of buildings in that they allow sunlight to enter, retain thermal heat energy, and provide a barrier to wind and rain. However, most existing windows are much poorer insulators than building walls and therefore, in well constructed buildings, are responsible for major undesired heat losses from buildings. An ideal window would allow clear viewing, be capable of transmitting sunlight to provide energy gains to building interiors, and poses a thermal resistance per area compared to building walls.

Among the prior efforts to reduce the energy losses or heat transfer through windows is to utilize double pane or double glazed windows having an airspace or air gap between the panes. This prior approach has substantially improved window efficiency from a heat transfer standpoint. Also, in recent years transparent materials have been inserted between the double panes of the window to further reduce the heat transfer while attempting to maintain the visibility therethrough. Aerogel is a leading candidate for transparent insulation material for use between double panes or otherwise sealed from the environment because of its good transparency and excellent insulating properties.

Silica aerogel is one of a class of transparent microporous optical materials suited for a variety of applications. Aerogel refers to material that is prepared using sol-gel processing (wet chemistry) techniques followed by a step in which the solvent used in the process is extracted to leave an open pore structure and low density. An aerogel must be sealed from the environment to make it impervious to water and it must be fabricated in such a way to improve strength.

An aerogel was first produced and its characteristics investigated over fifty years ago. Prior known approaches for producing aerogels are exemplified by U.S. Pat. Nos. 2,927,083 issued Mar. 1, 1960 to R. F. Nickerson; 3,652,215 issued Mar. 28, 1972 to H. A. Aboutboul et al; 3,672,833 issued June 27, 1972 to S. J. Teichner et al; 3,977,993 issued Aug. 31, 1976 to T. J. Lynch; 4,402,927 issued Sept. 6, 1983 to G. von Dardel et al; and 4,432,956 issued Feb. 21, 1984 to J. W. Zarzycki et al. Further interest in aerogels resulted from the need for low refractive index materials for use as elementary particle detectors (such as Chevenkov Counters). Aerogel applications as a glazing material was first investigated around 1980, and efforts since that time have been directed to its practicality and suitability as an insulating material, particularly for windows.

The transparent silica aerogels considered for window insulation applications are cross-linked structures of about 5% silica and 95% fine pores. This structure is obtained by a conventionally known sol-gel process of hydrolysis and polycondensation reactions of silicon aloxides in alcohol which gives an alcogel. The aerogel is obtained when the alcohol is extracted from the pores of the alcogel and is substituted with air. To prevent damage to the structure during evaporation which generates extremely high inter-facial forces (due to the very small size of the pores), the extraction is carried out at supercritical conditions which involve relatively high temperatures and high pressures. Another extraction technique is called freeze drying in which a gel structure is frozen and then vacuum dried.

Supercritical drying of the alcogel has resulted in satisfactory transparent aerogels. Because interfacial tensions vanishes at supercritical temperatures and pressures, the gel structure experiences very little stress during solvent removal. However, to remove the alcohol supercritically from the gel, relatively high temperatures of about 270° C. and high pressures of about 1800 PSI (12.4 MPa) are necessary. Therefore, the process is expensive and time consuming, requiring up to 2 or 3 days to dry one batch of gel structures.

Processes using supercritical drying for obtaining large scale transparent and visually clear aerogel arrays are not known in the prior art. However, small for biological and biomedical samples have been supercritically dried by using solvent substitution to replace water in the samples. After water replacement, the samples were supercritically dried at low temperatures for scanning electron microscopy on a small scale.

Since transparent aerogels are being considered as insulating glazing materials for energy efficient windows and other applications, thus requiring the production of large aerogel arrays, an efficient and inexpensive drying method is needed for the commercial viability of the material.

Therefore, it is an object of this invention to provide transparent aerogels for insulation applications.

A further object of the invention is to provide a process for fabricating transparent silica aerogels.

Another object of the invention is to provide an improved process for fabricating transparent Aerogels which significantly reduces the fabrication time period (from days to hours).

Another object of the invention is to provide an improved process for drying aerogel structures which includes substitution of a solvent for the alcohol in alcogels following the conventional steps of hydrolyzing and condensing alkoxides to form alcogels.

Another object of the invention is to provide an improved supercritical drying process for forming transparent aerogels which results in substantially lower drying temperatures and pressures while resulting in a significantly reduced drying time.

Another object of the invention is to provide transparent material with a low index of refraction for use in particle detectors.

Other objects and advantages of the invention will become readily apparent from the following description and accompanying drawings.

SUMMARY OF THE INVENTION

The present invention provides an efficient and inexpensive process for fabricating transparent aerogels which results in the commercial viability of aerogels as insulating glazing materials for energy efficient windows and other applications. In addition to use in windows for buildings, the transparent aerogel insulating material made in accordance with the invention finds applications in appliances such as refrigerators, ovens, freezer display cases, elementary particle detectors, etc.

The above-listed objects of the present invention are carried out by providing an improved supercritical drying process or operational step in the forming of transparent aerogels. The improved supercritical drying approach of this invention is carried out at temperatures of about 40° C. and pressures of about 1200 PSI (8.2 MPa) compared to the previously utilized temperatures of about 270° C. and pressures of about 1800 PSI (12.4 MPa), which results in a drying time of 6-10 hours compared to the prior time of 2-3 days, and utilizes less expensive equipment.

Basically the process involves the conventional steps of hydrolyzing and condensing alkoxides to form alcogels, but the conventional step of removing the alcohol and supercritical drying of the gels to form aerogels is replaced by a step of substituting for the alcohol in the alcogels a solvent, such as $CO_2$, having a critical temperature less than the critical temperature of the alcohol. The resulting gels are then dried at a supercritical temperature for the selected solvent, to provide a transparent aerogel array within a substantially reduced time period. Thus, the invention evolves around the improved supercritical drying process which involves liquid $CO_2$, for example, as a solvent to replace the alcogel and uses a temperature of about 40° C. and a pressure of about 1200 PSI which results in a drying time of 6-10 hours. The improved process provides greatly increased yields of large scale, structurally sound transparent aerogels.

BRIEF DESCRIPTION OF THE DRAWINGS

FIG. 1 is a flow diagram illustrating the steps for forming a silica aerogel in accordance with the prior art.

FIG. 2 schematically illustrates an apparatus utilized in the aerogel fabrication process of the prior art.

FIG. 3 is a flow diagram illustrating the steps of forming aerogels in accordance with the present invention.

FIG. 4 schematically illustrates an apparatus utilized in carrying out the aerogel forming process of the invention.

DESCRIPTION OF THE INVENTION

The present invention is directed to an improved process for forming transparent silica aerogels, which involves a supercritical drying technique which results in a significant reduction in process time and provides a greatly increased yield of large scale, structurally sound arrays. The improved supercritical drying technique involves substitution of a solvent, having a critical temperature less than the critical temperature of the alcohol, for the alcohol in the alcogel stage of the overall process. The resulting gels are dried at a supercritical temperature for the selected solvent substituted for the alcohol, to thereby provide a transparent aerogel array within a substantially reduced time period. The near ambient temperature supercritical drying technique of the invention occurs at ≦40° C. instead of ≧270° C. and at pressures ≦1200 PSI (8.2 MPa) instead of ≈1800 PSI (12.4 MPa), by substituting liquid $CO_2$ for alcohol in the alcogel stage of the overall aerogel forming process. The time of drying is reduced from 2-3 days to 6-10 hours. Tests conducted have shown that light scattering, microstructural properties and other characteristics of the aerogels produced by the process of this invention and by the prior known process using high temperature supercritical drying are as good or better than the prior aerogels. Further, the yield of usable aerogel arrays made by the prior known aerogel process was in the range of 20-50%, while the yield of usable aerogel arrays by the process of the invention is about 95%, a significant yield increase.

While the transparent silica aerogel insulating array provided by the present invention are described hereinafter for application to window glazing, the aerogels may be utilized for other insulation applications, such as in refrigerators and ovens. Also, as described hereinafter, the solvent used in the described process as a substitute for the alcohol is not limited to $CO_2$.

Transparent silica aerogel elements formed as insulating arrays on the surface of a window provided a substantial reduction in heat transfer. Formed in sheets or slabs, the aerogel arrays can replace the inner gap and occupy the space between the internal confronting surfaces of double-glazed windows. Structurally, the aerogels comprise cross-linked elements of approximately 5% silica, having a particle size of 3±2 nm, and 95% fine pores, 3-5 nm diameter.

In overview, the present invention includes an improved process for forming aerogel arrays. The aerogel array structures formed have not only been found to have substantially better optical and structural characteristics when compared to conventional structures, but they further exhibit consistently higher process yields in greatly reduced processing time.

Both conventional (prior art) structures and structures made by the present invention utilize a sol-gel process of hydrolysis and polycondensation reactions of silicon alkoxides in alcohol to yield alcogels. Either acid or base catalyzed hydrolysis and condensation reactions give gel arrays from alcoholic solutions of the alkoxides according to the reactions:

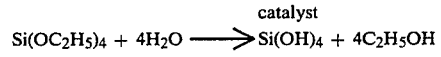

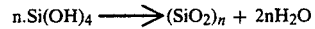

Referring to FIG. 1, which illustrates the prior art process, the alkoxide solutions in alcohol, $H_2O$, and catalyst (ammonia or ammonium fluoride, for example) are mixed and poured into molds as process step 20. Next, after forming (2-4 hour) and aging 24 hours under alcohol step 22, the alcogels are removed from the molds for drying step 24.

Next in conventional drying processes, the insulating aerogel is formed by removing the alcohol contained in the pores of the alcogel. The drying steps of both this invention and the conventional process utilize supercritical drying to maintain gel transparency. By solvent removal initiated at supercritical conditions, that is, above the critical temperature and pressure, the damage to the structure is minimized. It is believed that the presence of a gas-liquid boundary within the pores of the alcogel during drying generates extremely high interfacial forces. These forces are eliminated or minimized during supercritical drying because the temperatures and pressures within the gel structures are such that there is no gas-liquid boundry and relatively little stress is experienced while undergoing the solvent removal process.

Conventional drying in accord with the FIG. 1 process utilizes the prior art apparatus of FIG. 2. Gel arrays are placed in an enclosure 35, such as an autoclave, having an air escape valve 36 and outlet valve 37. The arrays indicated at 42, carried by a support such as wire mesh or the molds themselves, are positioned under alcohol to maintain transparency. After returning the head or cover to enclosure 35, additional alcohol is pumped in so as to remove traces of air via escape valve 36. Temperature is next brought up to 270° C. by electrical heater 38 and pressure maintained at 1800 psi, step 24 of FIG. 1, for at least 2-3 hours. The pressure is slowly vented via outlet 37 while maintaining the temperature at about 270° C. The total time for production is approximately 2-3 days and requires pressure vessels to be cycled in temperature over 200° C. The process yields approximately 20%-50%, with experience, usable aerogel arrays from the starting alcogel.

The process of the present invention may be more fully appreciated by referring to FIG. 3 in conjunction with the apparatus of FIG. 4. The alcogel arrays 62 are placed in a chamber 55, capable of 1200 psi at 40° C. Chamber 55 has an inlet valve 58, a vent valve outlet 60, and a sample outlet valve 65. Returning to FIG. 3, the chamber, filled with alcohol to again maintain transparency of the gel structure, is then sealed and cooled to 18° C., step 30 of FIG. 3, by coil 70 and cooling mechanism 72. Chamber 55 is pressurized with liquid $CO_2$ at 800 psi via inlet 58. Next, repetitive purging is utilized to displace the alcohol over a period of from 2 to 3 hours, process step 30. Sample outlet 65 is utilized to determine the $CO_2$ versus alcohol content as the process continues. When all traces of the alcohol are removed, the temperature is raised to 40° C. by coil 70 and heater mechanism 74, while maintaining the pressure at 1200 psi. This defines the supercritical drying step 32 of FIG. 3, which is maintained for a period of 30 minutes. Next, the $CO_2$ is slowly vented via outlet 60. When atmospheric pressure is reached, the gels may be removed. For example, the venting and pressure reduction is carried out over a time period in the range of 3 to 4 hours. The total drying process takes 6-10 hours, depending on the area of the aerogel being formed. In practice, conventional bonding and/or coupling agents may be then used to protect the arrays in specific applications. Yields of greater than 95% have been obtained using this inventive process.

Although $CO_2$ was used as the substituted solvent in the above-described example, it should be appreciated that other solvents may be utilized having critical temperatures at or near ambient as well as lower critical pressures. Table I includes some critical constants of fluids which may be used for critical point drying as well as water and alcohol for comparison puposes.

TABLE I

Critical Constants of Fluids Used in Critical Point Drying

| Name | Formula | Critical Temp. °C. | Critical lb/in² psi | Pressure MPa |
|---|---|---|---|---|
| Carbon dioxide | $CO_2$ | 31.1 | 1073 | 7.36 |
| Nitrous oxide | $N_2O$ | 36.5 | 1054 | 7.24 |
| Freon 13 | $CClF_3$ | 28.9 | 561 | 3.86 |
| Freon 23 | $CHF_3$ | 25.9 | 701 | 4.82 |
| Freon 116[2] | $CF_3-CF_3$ | 19.7 | 432 | 2.97 |
| Freon TF (Freon 113) | $CCl_2F-CClF_2$ | 214 | 495 | 3.40 |
| Methanol | $CH_3OH$ | 240 | 1155 | 7.93 |
| Ethanol | $C_2H_5OH$ | 243 | 927 | 6.36 |
| Water | $H_2O$ | 374 | 3204 | 22.00 |

The improved process is particularly useful for making visually clear insulation such as for building doors and windows, refrigerator display cases, and for high performance insulation in high temperature ovens and refrigerators. It has been determined that approximately one inch slabs of the aerogel can provide R8 insulation levels if not evacuated, to R18 levels if evacuated. An evacuated slab thickness of 0.7 cm provides R5 to R6 insulation levels, such as used in conventional refrigerators. In summary, the improved process should find wide use in a variety of insulation applications requiring varying thicknesses of the aerogels.

The improved process was verified in a conventional autoclave with only an additional valve added, and the apparatus for producing the aerogels can be scaled to production volume with little or no further development.

Optical and structural studies of transparent silica aerogels made in accordance with the present invention are set forth in document LBL-19272 entitled "Ambient Temperature Supercritical Drying of Transparent Silica Aerogels" by P. H. Tewari et al, dated Feb. 21, 1985. A more detailed discussion of the preparation, properties and characterization of conventionally made aerogels may be found in document LBL-18507 entitled "Advances In Transparent Insulating Aerogels for Windows" by A. Hunt et al, presented at the Passive and Hybrid Solar Energy Update Meeting, Wash. D.C., Sept. 5-7, 1984. For a more detailed discussion of starting materials and process steps of hydrolyzing and condensing alkoxides to form alcogels to optimize the desired transparency, strength and stability of the silica aerogels made inaccordance with the present invention, see document LBL-18586, "Structure and Chemistry of Sol-Gel Derived Transparent Silica Aerogel", P. H. Tewari et al, dated February 1985.

An important advantage of $CO_2$ drying of the alcogels is in the reproducibility of the product. In $CO_2$ dried batches made to verify the invention most of the aerogel samples were intact. Shrinkage was low and cracking of the samples was at a minimum. However, in tests conducted using the conventional high temperature drying process with the same starting materials, reproducibility was a problem, and many samples were unsatisfactory because of shrinkage or cracking.

Thus, it is apparent that an improved drying process for forming transparent aerogel insulating arrays has been provided by the present invention. Substantial reduction in processing temperatures from 270° C. to 32°-40° C., drying time reductions from 2-3 days to 6-10 hours, substantial increases in yield and reproducibility have been provided. Moreover, expensive equipment is not required, nor is the handling of dangerous and toxic chemicals over long periods of time. Process yields of greater than 95% are now realized, compared to the 20%-50% yield of conventional processes. In summary, these substantial improvements ensure commercial use and viability in the fabrication of new energy-saving commercial products.

While a particular embodiment of the apparatus and particular materials, temperatures, pressures, and times have been illustrated or described for purpose of explanation of the invention, such is not intended to limit the invention thereto, as modifications and changes will become apparent to those skilled in the art, and it is intended to cover in the appended claims all such modifications and changes as come within the scope of this invention.

What is claimed is:

1. In a drying process for forming transparent aerogel insulating arrays of the type utilizing the steps of hydrolyzing and condensing alkoxides to form alcogels, and subsequently removing the alcohol therefrom to form aerogels, the improvement comprising the additional step, after alcogels are formed, of substituting a solvent having a critical temperature less than the critical temperature of the alcohol for the alcohol in the alcogels, and drying the resulting gels at a supercritical temperature for the solvent, to thereby provide a transparent aerogel array within a substantially reduced drying time period.

2. The improvement of claim 1, wherein the step of substituting a solvent for the alcohol in the alcogels comprises replacing the alcohol with liquid $CO_2$.

3. The improvement of claim 2, wherein the $CO_2$ is substituted by:

placing the alcogels in a pressurizable chamber filled with alcohol, sealing the chamber and cooling same to a temperature below 40° C., repetitive directing pressurized $CO_2$ into the chamber causing purging of the alcohol, heating the thus purged gels under pressure to a temperature not greater than about 40° C. for a period of time, slowly venting the $CO_2$ from the chamber and slowly dropping the pressure in the chamber to atmospheric pressure to dry the gels, and removing the thus formed aerogels.

4. The improvement of claim 3, wherein the step of cooling the alcogels is carried out at a temperature of about 18° C., wherein the $CO_2$ is directed into the chamber at about 800 psi, and wherein the heating of the purged gels is carried out at a pressure of about 1200 psi.

5. The improvement of claim 1, wherein the step of substituting a solvent for the alcohol includes the step of selecting a solvent having a critical temperature less than the critical temperature of alcohol from the group consisting of carbon dioxide ($CO_2$), nitrous oxide ($N_2O$), Freon 13 ($CClF_3$), Freon 23 ($CHF_3$), and Freon $116^2$ ($CF_3$-$CF_3$).

6. A method for forming transparent silica aerogels for insulative applications comprising the steps of:

using a base catalyzed hydrolysis and condensation of alkoxides to form alcogels, and removal of alcohol from the alcogels to achieve aerogels, which includes the substitution of the alcohol with a solvent having a critical temperature less than that of alcohol, and supercritically drying the gels at the solvent's supercritical temperature to produce silica aerogels having transparency, strength and stability.

7. The method of claim 6, additionally including the steps of:

mixing an alkoxide solution in alcohol, and a catalyst, pouring the mixture into a mold, gelling the mixture and aging the alcogel for a time period under alcohol, and removing the alcogels from the molds for subsequent substitution of the alcohol with a solvent and supercritically drying the gels.

8. The method of claim 7, wherein the alkosol solution is formed from $Si(OC_2H_5)_4$ and $H_2O$, and wherein the catalyst is selected from ammonia and ammonium fluoride.

9. The method of claim 6, wherein the step of removal of alcohol from the alcogels is carried out by substituting for the alcohol a solvent selected from the group consisting of carbon dioxide, nitrous oxide, Freon 13, Freon 23, Freon $116^2$, and Freon TF (113).

10. The method of claim 9, wherein the step of supercritically drying the gels is carried out at pressures not greater than about 1200 psi and temperatures not greater than about 40° C.

11. The method of claim 10, wherein the step of substituting solvent for the alcohol includes the step of:

cooling the alcogels to a temperature of about 18° C. and repetitively purging the alcohol from the alcogels with the solvent.

12. The method of claim 11, wherein the alcohol is purged by a solvent of $CO_2$ at a pressure of about 800 psi.

13. The method of claim 12, wherein the repetitive purging of the alcohol by the $CO_2$ is over a time period of 2 to 3 hours, and wherein the supercritical drying of the gels at about 40° C. and pressure of about 1200 psi is maintained for a time period of about 30 minutes, and includes the steps of venting the $CO_2$ from the thus dried gels and reducing the pressure thereon to atmospheric, wherein the total drying time is about 6-10 hours.

14. In a process for forming transparent silica aerogels of the type utilizing the steps of hydrolyzing and condensing alkoxides to form alcogels, and subsequently removing the alcohol therefrom to form aerogels, the improvement comprising the steps of:

substituting a selected solvent for the alcohol in the alcogels, the selected solvent having a critical temperature less than the critical temperature of the alcohol, and supercritically drying the resulting gels at temperatures and pressures above the critical point for the solvent, thereby providing silica aerogels having transparency, strength and stability.

15. The process of claim 14, wherein the improvement is carried out by:

placing the alcogels in an enclosure which can be cooled and heated under pressure while maintaining the alcogels under alcohol to retain transparency, cooling the enclosure to a temperature of about 18° C., repetitively directing $CO_2$ at a pressure of about 800 psi into the enclosure to displace the alcohol in the enclosure and to purge the alcohol from the gels, periodically sampling the composition within the enclosure to determine the removal of the alcohol, heating the enclosure to a temperature of about 40° C. and increasing the pressure to about 1200 psi, maintaining the temperature and pressure in the enclosure for a time period of about 30 minutes, slowly venting the $CO_2$ from the enclosure and thereby reducing the pressure to atmospheric, and removing the thus formed transparent silica aerogel from the enclosure.

16. The method of claim 15, wherein the steps of venting the $CO_2$ and reducing the pressure in the enclosure is carried out over a time period in the range of 3 to 4 hours.

17. The method of claim 14, additionally including the step of treating the thus formed silica aerogels to protect same from adverse environments.

18. A transparent silica aerogel produced by the process of claim 14.

* * * * *